United States Patent [19]

Paul et al.

[11] Patent Number: 4,662,799

[45] Date of Patent: May 5, 1987

[54] APPARATUS AND PROCESS FOR PNEUMATICALLY CONVEYING PARTICULATE MATERIAL

[75] Inventors: Kermit D. Paul, Bethlehem, Pa.; Peter C. Lohrmann, Johannesburg, South Africa

[73] Assignee: Fuller Company, Bethlehem, Pa.

[21] Appl. No.: 735,032

[22] Filed: May 17, 1985

[51] Int. Cl.$^4$ .............................................. B65G 53/66
[52] U.S. Cl. ....................................... 406/14; 406/25; 406/93; 406/142
[58] Field of Search ........................ 406/12, 14, 15, 16, 406/24, 25, 30, 93, 142, 143, 146

[56] References Cited

U.S. PATENT DOCUMENTS

| | | | |
|---|---|---|---|
| 2,668,085 | 2/1954 | Baresch | 406/142 X |
| 2,707,132 | 4/1955 | Baresch | 406/14 |
| 3,355,221 | 11/1967 | Reuter | 406/15 |
| 3,599,832 | 8/1971 | Smith | 406/30 |

FOREIGN PATENT DOCUMENTS 669654  1/1939  Fed. Rep. of Germany ........ 406/30

Primary Examiner—Jeffrey V. Nase
Attorney, Agent, or Firm—Frank H. Thomson

[57] ABSTRACT

A process and apparatus for pneumatically conveying solid particulate material which includes a vessel or blow tank which is supplied with particulate material to be conveyed from a suitable source. A riser pipe extends into the vessel and has a material inlet near the bottom of the tank with its other end flow connected to a transport line. A bottom discharge arrangement is also contemplated. Gaseous fluid under pressure is supplied into the vessel to pressurize the vessel and entrain and convey material through the riser pipe to the material transport line and to a remote use point. A by-pass line is provided for selectively connecting the pressurized inside of the vessel with the riser pipe/transport line at a point downstream of the inlet for material. This by-pass line serves to selectively vent gaseous fluid under pressure in the vessel to the material conveying line when system pressure exceeds a predetermined limit. This results in an increase in air flow being supplied to the conveying line to thereby reduce the material to air ratio in the conveying line and control the conveying rate through the conveying line. Adjustment of the value of the predetermined pressure can be used to adjust the material conveying rate. A low level sensor is provided in the vessel for actuating a control mechanism to change the predetermined pressure at which the by-pass line will open to thereby permit gas under pressure in the vessel to be used for emptying the vessel.

8 Claims, 15 Drawing Figures

FIG. 3A PRESSURE

FIG. 3B MATERIAL

TIME

FIG. 4A PRESSURE

FIG. 4B MATERIAL

TIME

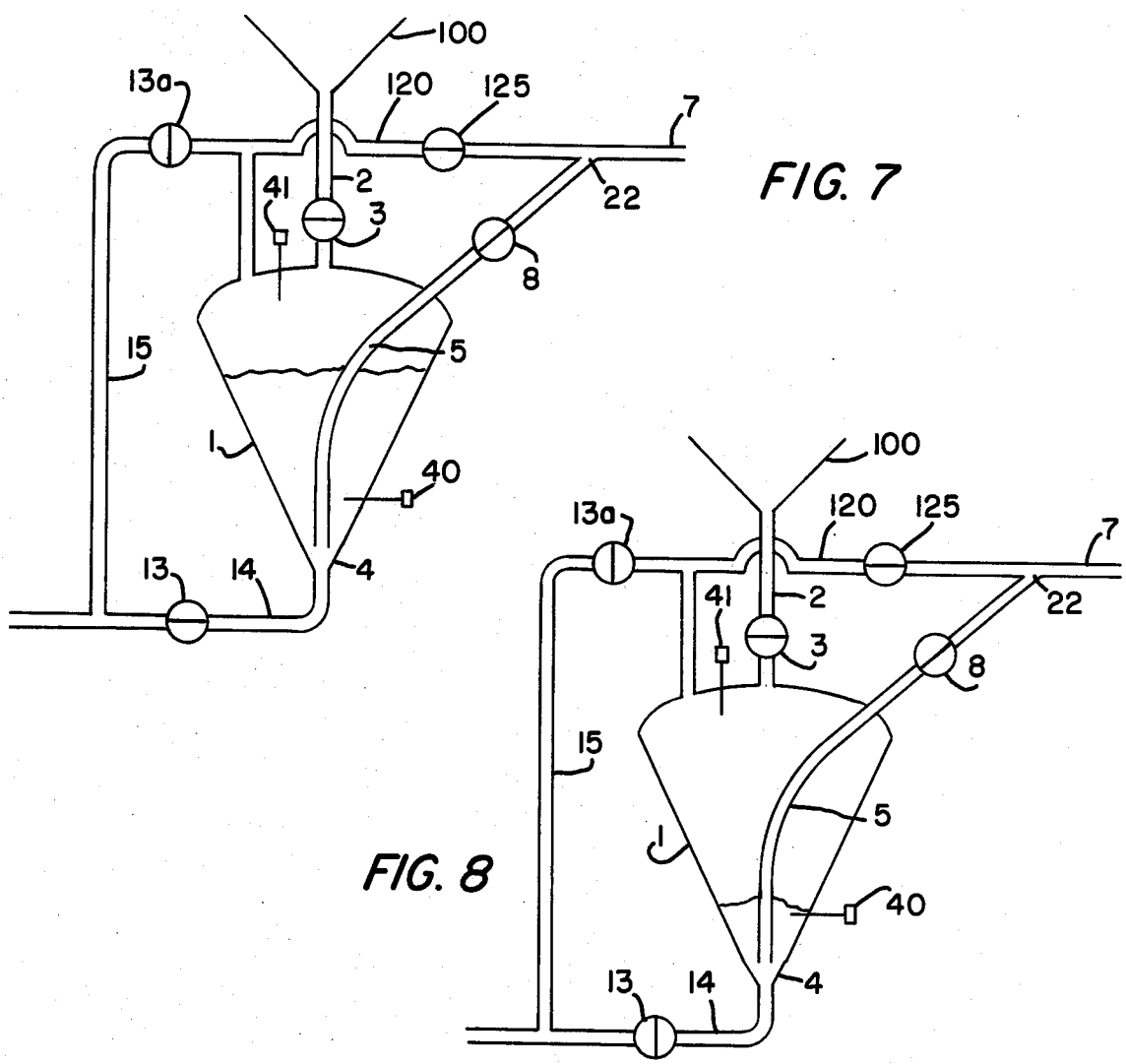
FIG. 7
FIG. 8
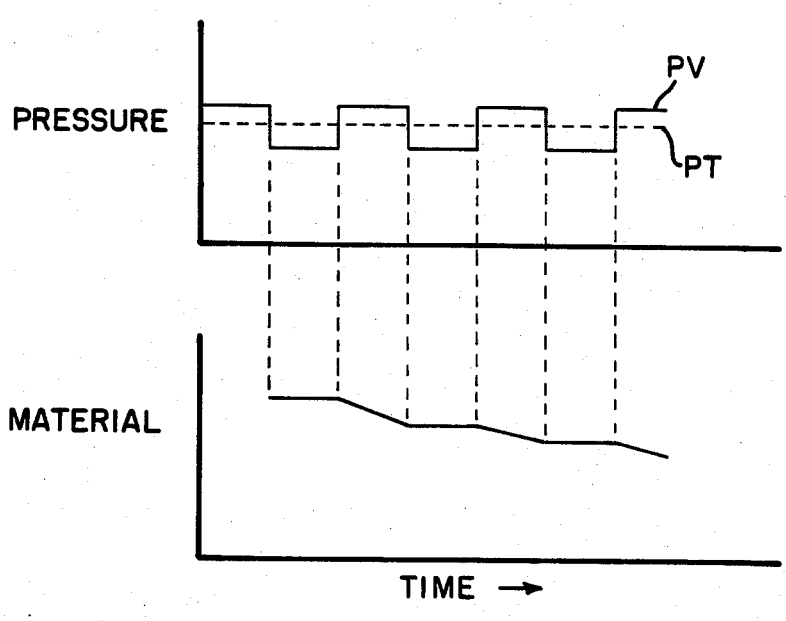
FIG. 9A
FIG. 9B
FIG. 9

APPARATUS AND PROCESS FOR PNEUMATICALLY CONVEYING PARTICULATE MATERIAL

BACKGROUND OF THE INVENTION

This invention relates to pneumatic conveying devices of the type wherein a vessel or "blow tank" is filled with solid particulate material to be conveyed and supplied with gaseous fluid under pressure to pressurize the tank. The invention also relates to pneumatic conveying apparatus using high pressure conveying air where material is conveyed at a high material to air ratio or in a "dense phase".

Prior to the present invention, it was generally known that it was desirable to control the air to material rate in the pneumatic conveying line to avoid material plugs and control the rate at which material is to be conveyed. Material plugs may occur due to a blockage in the line either mechanically induced or because of a build-up of material at pipe bends and other locations. If a high rate of material is continuously supplied to the conveying line during a build-up or line blockage, the pipe will eventually become further plugged and the system will have to be shut down to clear the plug. This is particularly a problem with dense phase conveying equipment.

Prior to the present invention, equipment known to the applicants controlled the material to conveying gas ratio by controlling the quantity of material being supplied to the conveying line. Such systems are shown for example in U.S. Pat. No. 3,403,941 issued Oct. 1, 1968 and U.S. Pat. No. 3,163,329 issued Dec. 29, 1964. While such apparatus functions adequately, the valves used for controlling the amount of material entrained into the gas conveying stream are exposed to direct contact by the material. Since the materials being conveyed may be abrasive, the valves tend to wear. Unlike other regulating mechanisms, this arrangement regulates the solids and air flow without being in direct contact with the abrasive solids.

Another system is shown in U.S. Pat. No. 3,599,832 where the material to air ratio in the conveying line is controlled by sensing the pressure in the conveying line downstream of the material feed point and utilizing this to control both the quantity of conveying air being supplied to the conveying line and the quantity of material being supplied to the conveying line. This system still relies on controlling the material to air ratio in the conveying line by controlling the quantity of material supplied to the conveying line.

According to the present invention the material conveying rate and the material to air ratio is controlled by regulating the quantity of gaseous fluid under pressure supplied to the inlet of the conveying line. This is done by comparing the pressure in the system to a predetermined set pressure and when this set pressure is exceeded, by passing conveying gas around the material feed point to the conveying line downstream of the material feed point. The conveying line between the point of introduction of material and the point at which the additional conveying air is supplied is substantially free of material flow control means during the material conveying cycle.

While it is known per se to bypass conveying air around the material feed point of a pneumatic transport system as shown by U.S. Pat. No. 1,889,163 issued Nov. 29, 1932, the system shown therein does not include the economies of the present invention.

A measure of pneumatic conveying system's efficiency is the weight of bulk solids conveyed per weight of air consumed. High pressure dense phase conveying systems are generally the most efficient systems with high solids to air ratios being achieved while discharging material from the tank. However, at the end of the discharge cycle (when the solids inventory is depleted from the tank) the tank still remains air-filled at the high conveying pressure. It is not uncommon to find more weight of air left in the tank after discharging the solids than that which flowed into the convey line alone with the solids during the discharge cycle.

Commonly, the trapped air is either vented through the convey line to purge the line free of solids thus preparing the line for the next discharge cycle or vented to the atmosphere through a vent valve and dust collector. Using this practice very little useful work is derived from this very significant quantity of air.

With the prior practice of venting large amounts of excess air to the conveying line, not only is a large quantity of air wasted, but also, this large volume of air containing particulate matter is travelling at high velocity which can cause damage to piping, valves in the line, and receiving tanks which are normally cushioned by a dense material content. In addition, such large quantities of air require larger pipelines and larger receiving vessels. According to the present invention, the air under pressure which remains in the tank is utilized to convey the final quantity of material from the vessel. Only a small volume of air need be vented to the conveying line after final clean out.

SUMMARY

It is therefore the principal object of this invention to provide a method and apparatus for pneumatically conveying particulate material which provides an improved means for controlling the rate of flow of material through the conveying line.

It is a further object of this invention to provide a method and apparatus for pneumatically conveying solid particulate material which provides an arrangement for efficiently utilizing the gaseous fluid under pressure which is contained in the vessel.

In general, the foregoing and other objects will be carried out by providing apparatus for conveying material by fluid under pressure comprising a vessel having an inlet for material; a material conveying conduit for discharging material from the vessel having a material inlet flow connected to the inside of the vessel; means for supplying gaseous fluid under pressure to the vessel for pressurizing the vessel and entraining material through the material inlet of the conveying conduit and conveying it through it the conduit; and means for controlling the rate at which material is conveyed through the material conveying conduit including means responsive to a condition for selectively supplying additional fluid under pressure directly from the vessel to a fluid inlet in the material conveying conduit downstream of the material inlet while maintaining the supply of gaseous fluid under pressure to the vessel; said conveying conduit being substantially free of material flow control means between its material inlet and the downstream fluid inlet of the material conveying conduit when material is being conveyed through the material conveying conduit.

The present invention provides a method whereby the air supply to the blow tank is safely shut off well before the tank is empty, thus reducing the overall air requirements. As a substitute air source, the air trapped in the vessel is used to convey the remaining solids from the tank and clean the material transport line. This is accomplished by controlling the rate of pressure decay in the vessel and controlling the solids injection rate into the material transport line. Without these controls the transport line would become blocked well before the solids were discharged from the tank.

The present invention also regulates other phases of the discharge cycle. The shape of the pressure/time curve at the beginning of the discharge cycle can be controlled.

BRIEF DESCRIPTION OF THE DRAWINGS

The invention will be described in connection with the annexed drawings wherein:

FIGS. 5 to 8 are similar views of the apparatus of the present invention in various stages of operation of the process of the invention, and FIGS. 9a and 9b are graphs showing a pulse conveying application of the present invention.

DESCRIPTION OF THE PREFERRED EMBODIMENT

Figure 1:
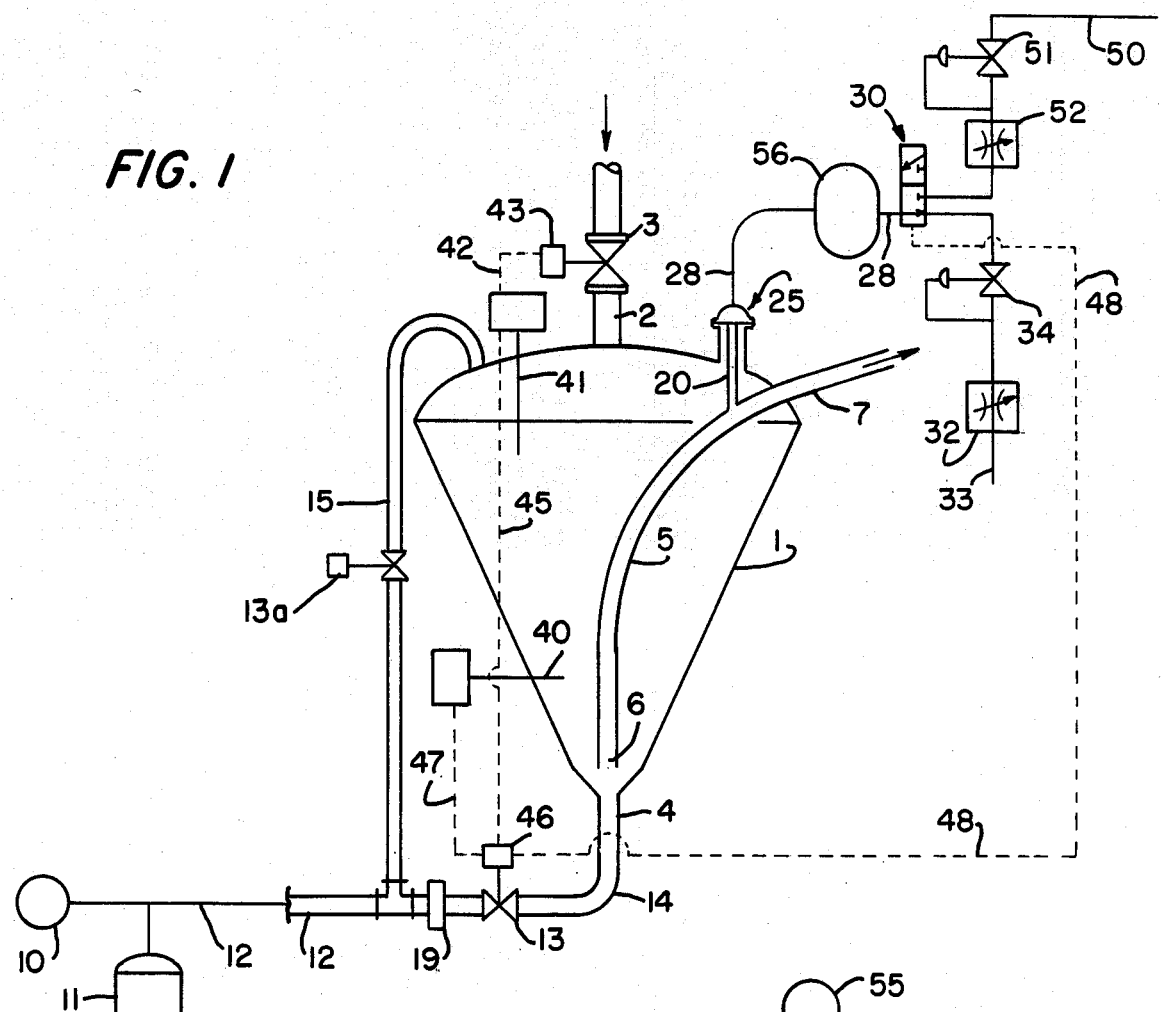
FIG. 1 is a diagrammatic view of a pneumatic conveying system according to the present invention.

Referring to FIG. 1, the invention includes a blow tank or pressure vessel generally indicated at 1 having an inlet 2 for solid particulate material to be conveyed which inlet may be controlled by a valve 3 and is flow connected to a source (not shown) of material to be conveyed. The vessel also includes an inlet 4 for gaseous fluid under pressure flow connected to the bottom of the vessel. A gas permeable divider may be included in the vessel dividing it into a lower air plenum chamber and an upper material chamber. If desired, aeration units may be placed in the sides of the vessel. The gas under pressure supplied to the tank serves to fluidize the material, pressurize the tank and entrain and convey material out of the tank in a manner known in the art.

A material conveying conduit or riser pipe 5 extends into the vessel towards the bottom and serves as an outlet for material. The lower end 6 of the riser duct 5 serves as an inlet for material. The other end of the riser pipe is connected to a transport line 7 (FIGS. 5 to 8). An on-off valve 8 may be included in the line 5 (FIGS. 5 to 8).

Gaseous fluid under pressure is supplied from a source such as a compressor 10 and reservoir 11 to the inlet 4 for gaseous fluid of vessel 1 through a line 12 and a control valve 13 to supply line 14. A flow control device 19 may be included in line 14 to set the air flow rate through line 14 to thereby fix the volume of air use during material conveying. A secondary line 15 also supplies gaseous fluid under pressure to the vessel from the source 10. The gaseous fluid under pressure supplied through 4 and 15 serves to fluidize material in the vessel, pressurize the vessel and to entrain material through conveying conduit 5. In a conventional manner, material is supplied through the inlet 2 to vessel 1 to substantially fill the vessel with particulate material. The vessel is then pressurized with the gaseous fluid under pressure and conveyed out through the conveying line 5. The apparatus of the present invention is particularly adapted for use in conveying materials which are in a size range suitable for fluidization such as cement, fly ash, floury alumina, talc, gypsum, and starch, but may also be used with other materials which are not easily fluidizable. The apparatus and process of the present invention is particularly designed for conveying material in a dense phase or at a high material to air ratio. Material is conveyed using a relatively high pressure air at a low volume thereby providing an efficient conveying system.

Pressures in the range of 30 to 80 psi with air velocities between 400 and 4000 fpm may be used with material loading (pounds of material per pound of air) in the range of 30 to 300 being within the capability of the apparatus and process. As material is conveyed out of the tank 1, the pressure in the tank is maintained substantially constant. With conventional apparatus, when the tank is essentially empty of material, there is a full tank of pressurized gas which is conventually used to either clean out the conveying line or is vented to atmosphere. In either case, it is an inefficient use of available energy and if air under pressure is vented through the conveying line, it entrains at high velocity the particulate material remaining in the lines which can result in abrasive wear in the lines and valves. With the present invention, the supply of air is stopped when the quantity of material in the vessel reaches a predetermined minimum, and the pressurized gas which remains in the tank is utilized to empty the tank.

Figure 2:
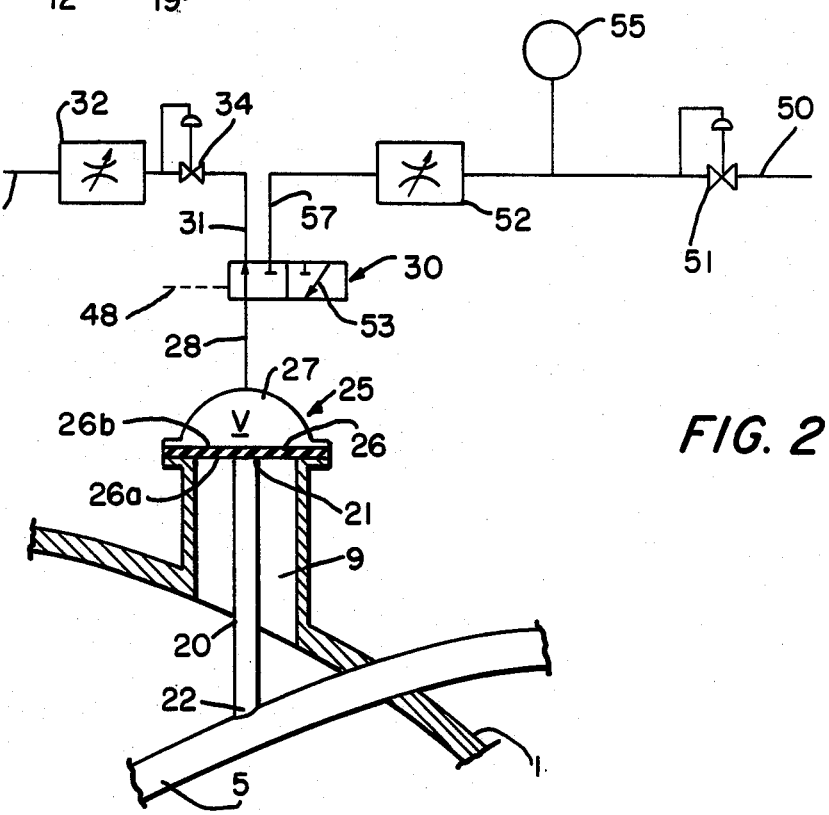
FIG. 2 is a view on an enlarged scale of a portion of the conveying system shown in FIG. 1.

With the present invention, as illustrated by the embodiment, shown in FIGS. 1 and 2, air under pressure in the tank can be vented to the conveying line through a by-pass line generally indicated at 20.

This by-pass line has an inlet 21 adapted to be selectively connected to the inside of the vessel 1 and an outlet 22 flow connected to the material transport line 7 downstream of the material inlet 6 of riser pipe 5 of the conveying conduit. The inlet 21 is selectively closed by a valve means 25 which includes a diaphragm valve such as an elastomeric valve membrane 26 closing the end of by-pass conduit 20 and exposed on one side 26a to the pressure in the vessel and on the other side 26b to a predetermined pressure.

The upper side 27 of the valve means 25 defines a volume V which is connected by conduit 28 through valve 30 and either through line 31, pressure regulator 34 and variable restriction 32 to atmosphere at 33 when the valve 30 is in the position shown in FIG. 2, or to a set pressure when the valve 30 is moved to the left.

The tank 1 includes a low level indicator 40 and a high level indicator 41. The high level indicator is connected by means 42 to a controller 43 for closing valve 3 when the level of material in the tank reaches the level of indicator 41. The level indicator 41 is also connected by means 45 to a controller 46 for opening gas inlet valve 13. The low level indicator 40 is connected by means 47 to controller 46 and valve 13 and by means 48 to operator valve 30. Valve 13a in line 15 can also be automatically controlled by level indicator 41. The low level indicator 40 may be used to close valve 13 at the start of the convey/vent cycle.

The volume V of the upper end 27 of valve means 25 is adapted to be selectively connected to a predetermined pressure by moving valve 30 to the left as shown in FIG. 2 so that the volume 27 of valve 25 is flow connected to a source of gaseous fluid under pressure (not shown) from line 50, pressure regulator 51 and variable restriction 52 to line 57 and line 53 in valve 30 and then through conduit 28 to valve means 25. A pressure sensor 55 may be included in line 50. In addition, as shown in FIG. 1, a reservoir 56 may be included in line 28.

The embodiment shown in FIGS. 5 to 8 is a simplified diagrammatic model of the system of the present invention. In this case, the by-pass/modulating valve 125 and by-pass line 120 have been shown externally of the vessel, but are essentially equivalent in concept to valve 25 and by-pass line 20 in FIGS. 1 and 2.

The sequence of operation of the apparatus will now be described with reference to FIGS. 5 to 8. During the vessel fill cycle, the valve 3 is open to allow particulate material to be supplied from a source 100 through inlet 2 to fill tank 1 with dry free flowing pulverulent material. During the fill cycle, the valves 13 and 13a are closed and the tank may be vented to atmosphere through a vent (not shown) or may be vented past open valve 25 or 125 through the material transport line 7. This is accomplished in the embodiment of FIGS. 1 and 2 because the top 27 of valve 25 may be exposed to atmosphere through valve 30, lines 31, restriction 32 and outlet 33. Since the pressure in the tank 1 will be built up as material fills the vessel, compressing gas in the tank, the valve element 26 is lifted and air is vented around valve 26, through bypass line 20 to conveying line 7. The valve 125 in FIGS. 5 to 8 may be opened by suitable control means. The fill cycle is illustrated between points a and b in FIG. 3b and FIG. 4b. The positioning of the various valves are shown in FIG. 5.

Figure 5:
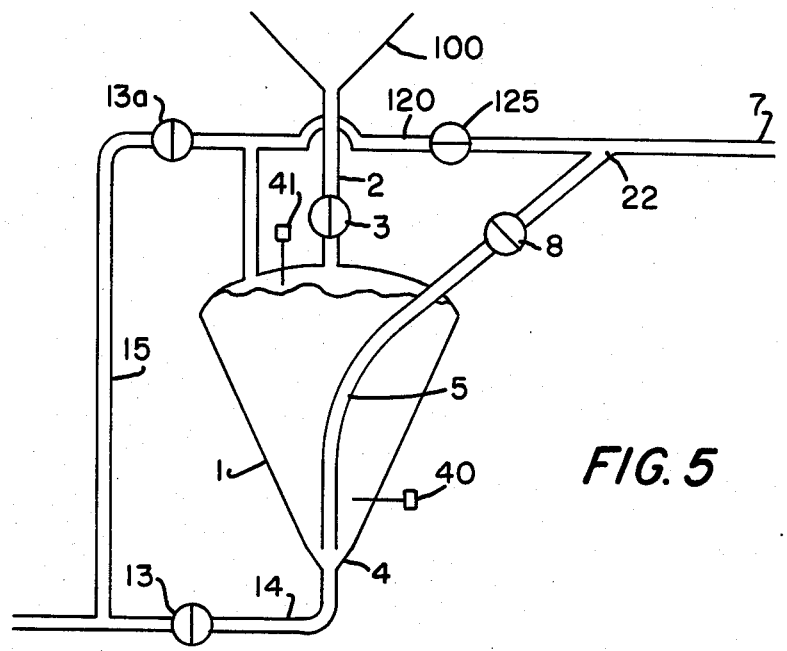
Figure 6:
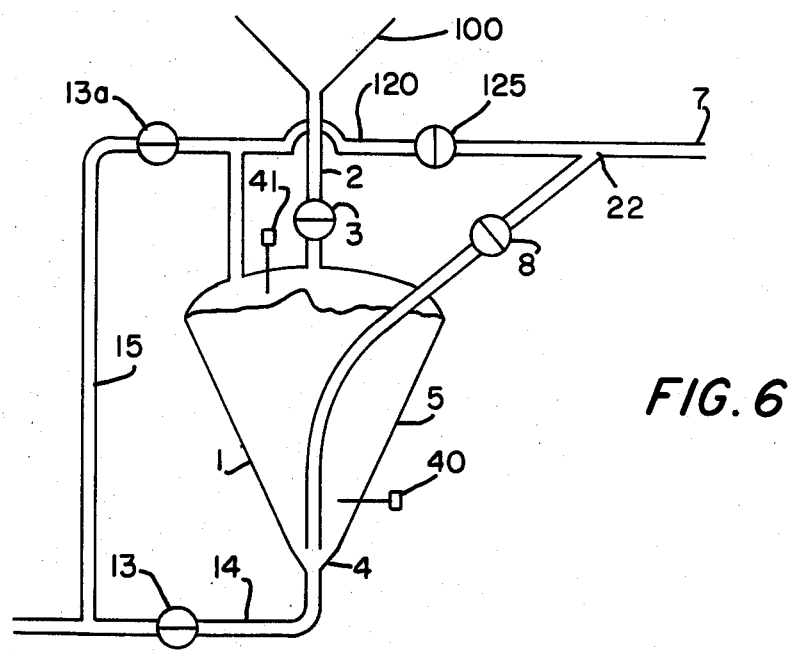

When the level of material in the tank reaches indicator 41, valve 3 is closed stopping material supply to the vessel 1. Valve 30 is then moved to the left as shown in FIG. 2 to connect the valve means 25 or 125 to the predetermined pressure being supplied through 50. The valve 13 is then opened by controller 46 and gaseous fluid under pressure is supplied through line 14 to pressurize the vessel and fluidize material in the vessel. Similarly, valve 13a permits air passage through line 15 to pressurize the vessel 1. As illustrated in FIG. 6, valves 13 and 13a are opened and valves 3, 125, and 8 are closed. With the embodiment shown in FIGS. 5 to 8 when a discharge valve 8 is used and closed, the pressurizing cycle is shown between points b and c in FIG. 4. With the embodiment of FIGS. 1 and 2 where conveying line 5 is free of flow control means, the conveying cycle will begin as pressure builds up and the flat curve between b and c in FIG. 4 will be replaced by the curve in FIG. 3b.

In the conveying cycle in the embodiment of FIGS. 5 to 8, the pinch valve 8 opens so that during conveying operations, the riser pipe 5 is substantially unobstructed and free of material flow control means. If desired and as illustrated in FIGS. 1 and 2, a valve is not required in this line during conveying and as previously stated, material conveying will start during pressurization. As air under pressure flows through inlet 4, solids are entrained in the air and begin to discharge through riser pipe 5 to material transport line 7. Simultaneously, a controlled rate of air flow passes from source 50, variable restriction 52 and passage 53 in valve 30, and line 28 to valve 25 and volume V. A predetermined pressure verses time profile can be established by properly sizing volume V and the restriction 52. The pressurizing cycle is shown between points b and c in FIG. 4 and the pressurizing and initial conveying cycle are shown by the curve between points b and c in FIG. 3.

Figure 3:
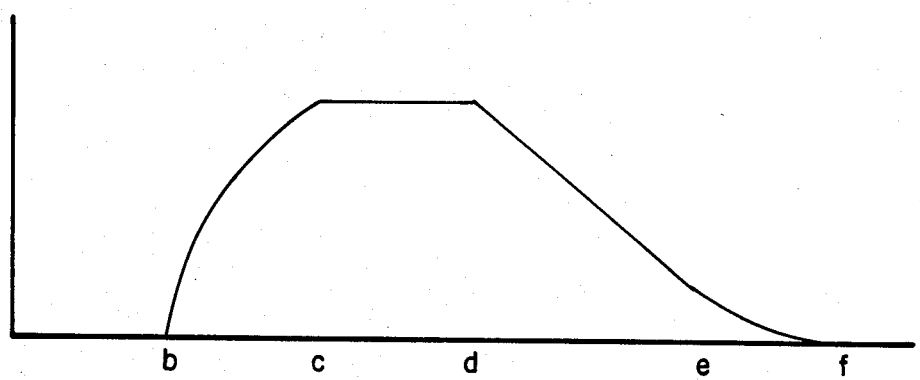
FIGS. 3a and 3b are graphs showing pressure in the tank versus time and the weight of material in the tank versus time.
Figure 3:
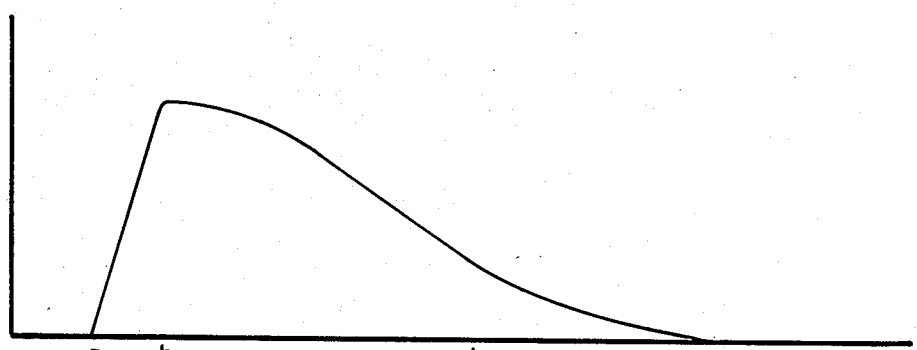
Figure 4:
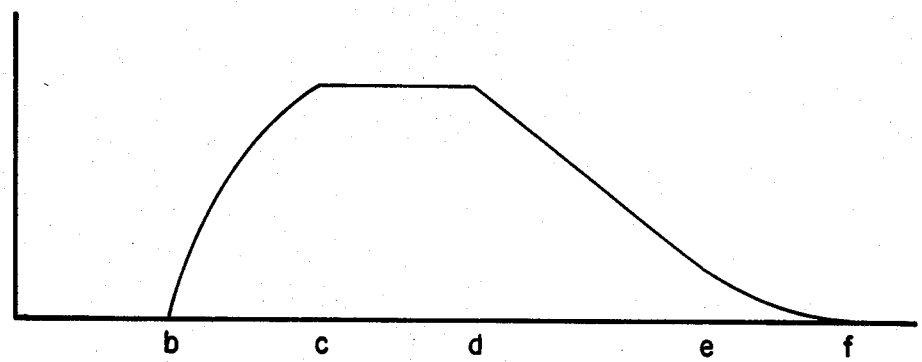
FIGS. 4a and 4b are graphs similar to FIGS. 3a and 3b but showing a system having a discharge valve in the material line.
Figure 4:
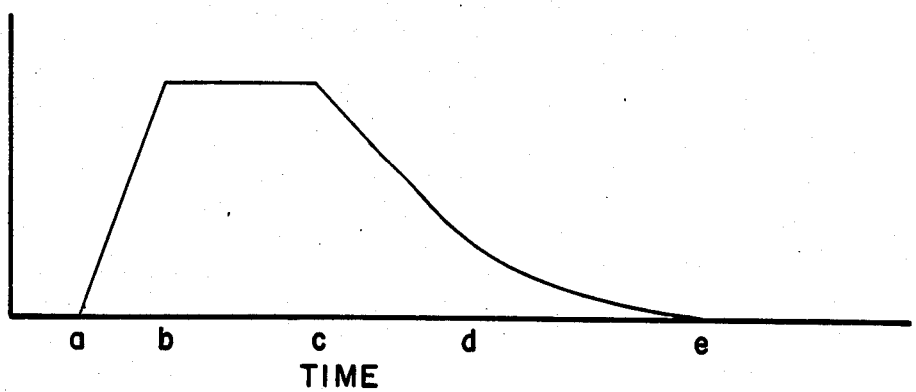

Once the pressure in the vessel exceeds the predetermined pressure in line 50 steady state conveying is achieved and the quantity of material in the vessel will decrease at a steady rate as illustrated by the substantially straight line between points c and d of both FIGS. 3 and 4. Pressure will remain constant.

Whenever the pressure inside vessel 1 exceeds the predetermined pressure in volume V, the valve element 26 will lift off the by-pass 20 to open end 21 and permit air under pressure in the vessel 1 to enter the material transport line 7 downstream of the material inlet 6 so that less material enters the conveying line through inlet 6 to thereby "lean out" the material to air ratio reducing the conveying rate. This also brings the pressure in tank 1 in balance with the preestablished or predetermined pressure required to avoid plugging in the line 7. When the pressure in the tank equals the pressure in the volume V, steady conveying conditions are reached as illustrated between points c and d in FIG. 3. Solids in the vessel 1 are continuously depleted until a predetermined minimum quantity of material remains in the vessel as indicated by level sensor 40.

During the conveying cycle, air under pressure is continuously supplied through inlet 4 as illustrated in FIG. 7.

The valve means 25 and its associated air supply and restriction 50, 51, 52, 57, and 30 define a means for controlling the rate at which material is conveyed through the material conveying conduit 7 including the valve 25 being responsive to a condition (the system pressure) as measured in the vessel 1 for selectively supplying additional fluid under pressure directly from the vessel to a fluid inlet 22 in the material conveying conduit 7 downstream of the material inlet 6. The supply of gaseous fluid to the vessel 1 through line 14 continues.

During conveying operations, the pressure downstream of the tank 1 may increase due to a line blockage or a change in conveying conditions. This will result in an increase of pressure build up in the vessel 1. Such an increase in pressure will act through opening 9 on the valve means 25 (125 in FIGS. 5 to 8). If the pressure increases beyond the predetermined pressure in volume V, the valve element 26 will open causing a leakage of air in the tank through bypass line 20 (120 in FIGS. 5 to 8) into the conveying line 7 at a position downstream of material inlet 6. This increase in air flow will reduce the material to air ratio thereby providing additional conveying air to decrease the rate at which material is being conveyed while eliminating any line blockages. In practice, the increase conveying pressure may be sensed in the tank 1, upstream of the air inlet 4 in line 12 or 14 or in the conveying line 7 itself. This is referred to herein as "system pressure".

When the level of material in the tank reaches the level sensor 40, a signal will be sent through means 47 and 48 to move valve 30 to the position shown in FIG. 2 and close air inlet valve 13. This position is shown in FIG. 8 and at point d in FIG. 3 and can be referred to as commencement of the "blowdown" period of conveying/venting cycle. At this time, the pressure remaining in the tank will be greater than a pressure set by regulator 32. The higher pressure in the tank will slightly open valve means 25 to 125 to bypass pressurized air at a controlled rate through bypass 20 or 120 conduit to conveying line 7 downstream of material inlet 6. The pressure in the tank will serve to convey material remaining in the tank through riser pipe 5 and through transport line 7 until the tank is substantially completely empty. Some of the air in the tank will be bled through by pass 20 at a controlled rate. Thus, instead of venting the remaining air in the tank to atmosphere or merely venting the air in the tank to the conveying line to flush out the conveying line, as in the case with prior practices, the air remaining in the tank after a predetermined material quantity is reached is used to empty the vessel. This conveying/venting cycle is illustrated in FIGS. 3 and 4 between points d and e. The regulator 34 and flow restrictor 32 serve to control the length of the convey vent cycle between points d and e and their effective control conveying rate.

When material is exhausted from the vessel 1, the remaining slight pressure in the vessel is exhausted through the conveying line. This pressure depletion is illustrated between points e and f in FIGS. 3a and 4a.

The setting of restriction 32 and the size of the volume V establish the shape of the preset tank pressure decay curve and the rate at which solids are discharged during the blow down cycle. At any time when the tank pressure is higher than the pressure at V, the valve 25 modulates to cause extra air to pass into the conveying line 7 downstream of material inlet 6 to "lean out" or dilute the conveying line solids/air mixture. Eventually, the solids are dissipated from the tank (point e in FIG. 3) and the residual pressure and air mass in the tank 1 are used to clean out the conveying line.

Also with the present invention a means has been provided for controlling the rate at which material is conveyed through the conveying line by modulating the conveying air rather than by modulating the input of material into the conveying line. With prior apparatus a valve mechanism would be utilized at the material inlet 6 of the conveying line. With the present invention the conveying line is substantially unobstructed and substantially free of a material flow control means between the material inlet 6 and the downstream gas inlet at 21 during the material conveying cycle. This is accomplished by controlling the pressure supplied through line 50 to the volume V above valve element 26. If this set pressure is increased, then a higher pressure in the tank is required before the valve element 26 is opened to allow gas in the tank to flow through bypass conduit 26 to conveying line 5, a higher material to air ratio will be maintained and the material conveying rate will be increased. If it is desired to reduce the conveying rate then the pressure at V is reduced by adjusting pressure regulator 51 so that the pressure in the tank will more easily open valve 26 supplying a higher volume of air to the conveying line 5 so that less material leaves the tank through inlet 6 thereby reducing the material to air ratio and thus the conveying rate.

The method and apparatus of the present invention substantially increases the overall pneumatic conveying system efficiency. For example, a typical material to be conveyed at 33 STPH over a distance of 365 feet in a conventional blow tank system would require a tank pressure of 65 PSIG conveying through a 3 inch line. The overall system mass flow ratio (the total pounds of material per pound of air) would be 71 pounds per pound. By applying the present invention to the same tank while conveying at the same overall rate, the air consumption can be reduced. The mass flow ratio would increase from 71 pounds per pound to 87 pounds per pound. This is a 23% increase.

The present invention can function as a blow tank vent valve so that if the pressure in the tank suddenly increases, the valve element 26 will open venting the tank through conveying line 5 thereby reducing hazards.

Through the proper selection of the conveying cycle control constants at the reservoir 56, and the regulators 32 and 52, the device eliminates the normally required tank discharge valve. A further benefit of the invention is that the outrush of air at the end of the conveying cycle is controlled. The air filter size at the receiving bin for the material being conveyed can be substantially reduced as a result of the controlled velocities at the end of the convey cycle.

With the present invention the conveying rate of material can be directly changed by adjusting the regulating valve 51. This change will change the pressure at 27 to thereby control the air material ratio.

From the foregoing, the method and process for conveying solid particulate material according to the present invention should be apparent. The method includes providing a vessel 1 having an inlet 2 for material flow connected to a source 100 of material to be conveyed, an inlet 4 for gaseous fluid under pressure and a material conveying conduct in the form of riser duct 5 which has a material inlet 6 flow connected to the vessel 1 near the bottom of the vessel and connected at its other end to a material transport line 7 for conveying material to a remote location. The vessel is filled with material to be conveyed by opening valve 3 until material reaches the predetermined maximum quantity at indicator 41 (FIG. 5). The vessel is pressurized by closing the inlet valve 3 and opening the valve 13 and 13a to supply gas under pressure thereto. This pressurization also serves to fluidize material in the vessel (FIG. 6). Material is conveyed from the vessel through riser duct 5 by opening on-off valve 8 and continuing to supply gaseous fluid under pressure to the vessel through conduit 14 and inlet 4 for entraining material and conveying it through material inlet 6, riser pipe 5 and transport line 7 (FIG. 7). Conveying takes place until the quantity of material in the vessel reaches a predetermined minimum as measured by low level indicator 40. Other quantity indicators such as weigh scales may be substituted for level indicators 40 and 41.

When material reaches the set minimum, the remaining portion of material in the vessel is conveyed through the lines 5 and 7 using the residual pressure in the vessel 1 by closing the valves 13 and 13a and the inlet 4 for gaseous fluid under pressure while venting at a controlled rate gaseous fluid under pressure from the vessel 1 to the material conveying conduit 7 at a point 22 downstream of the material inlet 4 (FIG. 8). This venting at a controlled rate is carried out by the valves 25 in FIGS. 1 and 2 and 125 in FIGS. 5 to 8.

The system control features are carried out by comparing the pressure in the system to a predetermined pressure during the step of conveying material so that when the pressure in the conveying system as sensed on the side 26a of valve element 26 in FIG. 2, exceeds the predetermined pressure, gaseous fluid under pressure is by-passed around the riser pipe 6 through by-pass 20 or 120 and supplied directly to the material conveying conduit at 22 downstream of the material inlet 6.

The system is vented during the blowdown cycle (FIG. 8) at a controlled rate by comparing the pressure in the system pressure (usually in the vessel itself) to a second predetermined pressure. This is done by moving valve 30 to the position shown in FIG. 2 so that pressure on the underside 26a of valve element is compared against pressure on upperside 26b which is exposed to atmosphere through restriction 32 to achieve a controlled vent/convey cycle.

The "system pressure" may be measured upstream of the gas inlet 4 in conduit 12 or 14 or downstream in the conveying line 7 as well as in the vessel 1.

The present invention is primarily directed to conveying fluidizable material. It should be understood however that the invention may be applicable to non-fluidizable material by imposing a step function on the pressure in volume V through pressure regulator 51 so that solids are conveyed is a pulse flow during the conveying cycle. The pressure in the tank is indicated at PT in FIG. 9a and the pressure in volume V is indicated at PV in FIG. 9a. When the pressure in volume V (PV) exceeds the tank pressure (PT), a slug of material will be entrained into the conveying conduit 5, 7 and the level of material quantity in the vessel 1 will decrease (FIG. 9b). If the pressure at V is then reduced or stepped so that PT exceeds PV, the valve element 26 will open and allow air under pressure to enter the conveying line to move material through the conveying line, but no additional material will be admitted to the conveying line and material level in the vessel 1 will remain constant. If the pressure at V is then stepped so that PV exceeds PT, more material will enter the conveying line to continue the conveying of material in slugs and material level in the vessel will drop.

With the present invention, the material conveying rate can be directly changed by adjusting the pressure regulating valve 51. The pressure/time and convey/time profile of FIG. 3 can be controlled through the entire discharge cycle by the present invention. The quantity of material which is conveyed from the vessel 1 is inversely proportional to the rate at which gaseous fluid under pressure is vented from the vessel through by-pass duct 20 or 120 whereby increasing the rate at which gaseous fluid is vented by decreasing the set pressure in V decreases the quantity of material which is conveyed and decreasing the rate at which gaseous fluid is vented by increasing the pressure at V increases the quantity of material which is conveyed. This is particularly true during the blow down cycle.

While the invention has been shown using a top material discharge through riser 5 with a bottom air inlet at 4, it should be understood that it is within the contemplation of this invention to utilize the concepts of the invention on a bottom discharge tank. In such an application, air under pressure would be supplied to the top of the tank such as through conduit 15 and material would be discharged from the bottom. During the blowdown cycle, air under pressure would be bypassed around the material inlet to a downstream point in the conveying line.

From the foregoing it should be apparent that the objects of this invention have been carried out. It is intended however, that the invention be limited solely by that which is within the scope of the appended claims.

I claim:

1. Apparatus for conveying material by fluid under pressure comprising:

a vessel having an inlet for material;

a material conveying conduit for discharging material from the vessel having a material inlet flow connected to the inside of the vessel;

means for supplying gaseous fluid under pressure to the vessel for pressurizing the vessel and entraining material through the material inlet of the conveying conduit and conveying it through the conduit;

means for controlling the rate at which material is conveyed through the material conveying conduit including means responsive to a condition for selectively supplying fluid under pressure directly from the vessel to a fluid inlet in the material conveying conduit downstream of the material inlet while maintaining the supply of gaseous fluid under pressure to the vessel;

said conveying conduit being substantially free of material flow control means between the material inlet and the downstream fluid inlet of the material conveying conduit when material is being conveyed through the material conveying conduit;

said means responsive to a condition including differential pressure means responsive to the difference between the pressure inside the vessel and a predetermined pressure;

said means for selectively supplying fluid under pressure directly from the vessel to the fluid inlet in the material conveying conduit downstream of the material inlet further includes a by-pass conduit flow connected at one end to the downstream fluid inlet and selectively flow connected at its other end to the inside of the vessel and said differential pressure means is a by-pass valve means for controlling the flow of fluid under pressure from said vessel into said by-pass conduit;

said by-pass valve means being responsive to the difference between the pressure inside the vessel and a predetermined pressure so that when the pressure inside the vessel exceeds said predetermined pressure, said by-pass valve means opens to supply fluid under pressure from the vessel directly to the conveying conduit so that less material enters the material inlet to increase the ratio of conveying fluid to material in the conveying conduit and thereby control the rate at which material is conveyed;

first sensing means for sensing when the quantity of material in the vessel reaches a predetermined minimum;

valve means responsive to said sensing means for changing the predetermined pressure at which said by-pass valve means is responsive.

2. Apparatus for conveying material according to claim 1 further comprising second sensing means for sensing when the quantity of material in a vessel reaches a predetermined maximum; and inlet valve means responsive to said second sensing means for closing said inlet.

3. A method of conveying solid particulate material from a source to a remote location comprising the steps of providing a vessel having an inlet for material flow connected to a source of material to be conveyed, an inlet for gaseous fluid under pressure and a material conveying conduit having a material inlet flow connected to the vessel for conveying material from the vessel to a remote location; opening the inlet for material to fill the vessel with material to be conveyed; pressurizing the vessel by closing the inlet for material and opening the inlet for gaseous fluid; then conveying material from the vessel while continuing to supply gaseous fluid under pressure to the vessel for entraining material and conveying it through the material conveying conduit until the quantity of material in the vessel reaches a predetermined minimum; then conveying through the material conveying conduit a remaining portion of material in the vessel using the residual pressure in the vessel by closing the inlet for gaseous fluid while venting at a controlled rate gaseous fluid under pressure from the vessel to the material conveying conduit at a point downstream of the material inlet; comparing the pressure in the vessel to a predetermined pressure during the step of conveying material from the vessel so that when the pressure in the conveying vessel exceeds the predetermined pressure, gaseous fluid under pressure is supplied directly to the material conveying conduit downstream of its material inlet, by-passing the material inlet; and comparing the pressure in the vessel to a second predetermined pressure different from the first predetermined pressure during the step of venting gaseous fluid from the vessel at a controlled rate whereby when the pressure in the vessel exceeds the second predetermined pressure, gaseous fluid in the vessel is vented to the material conveying conduit to thereby control the rate at which a remaining portion of the material is conveyed from the vessel.

4. Apparatus for pneumatically conveying pulverulent material from a source to a remote location comprising:

a vessel having a material inlet adapted to be connected to a source of material to be conveyed and a gas inlet near the bottom of the vessel which is adapted to be connected to a source of gaseous fluid under pressure;

a riser pipe extending into the vessel having an inlet for gas and entrained pulverulent material near the inlet for gas and an outlet for gas and entrained material adapted to be connected to a material transport line for pneumatically conveying material to a remote location whereby gaseous fluid under pressure supplied to the vessel pressurizes the vessel, entrains material contained therein and conveys it through the riser pipe to the transport line;

conduit means for bypassing gaseous fluid under pressure from the vessel around said riser pipe to said transport line;

valve means operatively associated with the conduit means for controlling the flow of gaseous fluid through the conduit means by comparing the pressure in the vessel to a predetermined pressure whereby when the pressure in the vessel exceeds the predetermined pressure, the valve means allows gaseous fluid to flow through the conduit means to the transport line;

said valve means being responsive to a first pressure when the quantity of material in the vessel is greater than a predetermined minimum and a second, different pressure when the quantity of material in the vessel is less than said predetermined minimum;

means for stopping the supply of gaseous fluid under pressure to the vessel when the quantity of material in the vessel reaches a said predetermined minimum and changing the predetermined pressure at which gaseous fluid under pressure is by-passed around the riser pipe from said first pressure to said second pressure for conveying a remaining portion of material out of the vessel and venting gaseous fluid under pressure from the vessel.

5. Apparatus for conveying material by fluid under pressure comprising:

a vessel having an inlet for material;

a material conveying conduit for discharging material from the vessel having a material inlet flow connected to the inside of the vessel;

means for supplying gaseous fluid under pressure to the vessel for pressurizing the vessel and entraining material through the inlet of the conveying conduit and conveying it through the conduit;

a by-pass conduit flow connected at one end to a fluid inlet in the material conveying conduit downstream of the material inlet and at its other end to the inside of the vessel for selectively supplying fluid under pressure directly from the vessel to said conveying conduit downstream of the material inlet;

means for controlling the rate at which material is conveyed through the material conveying conduit including by-pass valve means operatively associated with said by-pass conduit for controlling the flow of fluid under pressure from said vessel through said by-pass conduit;

said by-pass valve means being responsive to the difference between system pressure and a predetermined pressure so that when the system pressure exceeds said predetermined pressure, said by-pass valve means opens to supply fluid under pressure from the vessel through said by-pass conduit to the conveying conduit;

first sensing means for sensing when the quantity of material in the vessel reaches a predetermined minimum; and means responsive to said first sensing means for changing the predetermined pressure at which said by-pass valve means is responsive.

6. Apparatus for conveying material by fluid under pressure according to claim 5 wherein said by-pass valve includes a member for selectively opening and closing said by-pass conduit and means defining a volume; said means for controlling the rate at which material is conveyed further includes means for selectively flow connecting said volume to a source of gaseous fluid under pressure and means for selecting flow connecting said means defining a volume to atmosphere; and said means responsive to said first sensing means includes valve means for connecting said volume to said means for selectively flow connecting said means defining a volume to atmosphere.

7. Apparatus for conveying material by fluid under pressure according to claim 6 further comprising a variable restriction in said means for selectively flow connecting said means defining a volume to atmosphere for controlling the rate at which material is conveyed through the conduit after the quantity of material in said vessel reaches said predetermined minimum.

8. Apparatus for conveying material by fluid under pressure according to claim 7 further comprising a variable restriction in said means for selectively flow connecting said means defining a volume to a source of gaseous fluid under pressure for controlling the rate at which material is conveyed through the conduit before the quantity of material in the vessel reaches said predetermined minimum.

* * * * *